(12) United States Patent
Rehbein et al.

(10) Patent No.: US 7,294,028 B2
(45) Date of Patent: Nov. 13, 2007

(54) ELECTRICAL CONTACT

(75) Inventors: Peter Rehbein, Weissach (DE); Volker Haas, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/529,112

(22) PCT Filed: Sep. 3, 2003

(86) PCT No.: PCT/DE03/02916

§ 371 (c)(1),
(2), (4) Date: Sep. 22, 2005

(87) PCT Pub. No.: WO2004/032166

PCT Pub. Date: Apr. 15, 2004

(65) Prior Publication Data

US 2006/0105641 A1    May 18, 2006

(30) Foreign Application Priority Data

Sep. 27, 2002  (DE)  ................. 102 45 343

(51) Int. Cl.
 *H01R 13/02* (2006.01)
(52) U.S. Cl. .............. 439/886; 428/614; 428/646
(58) Field of Classification Search ........ 439/886; 428/614, 646–648

See application file for complete search history.

(56) References Cited

U.S. PATENT DOCUMENTS

| 4,399,339 | A | | 8/1983 | Storm | |
|---|---|---|---|---|---|
| 5,028,492 | A | * | 7/1991 | Guenin | 428/614 |
| 5,316,507 | A | * | 5/1994 | Capp | 439/886 |
| 5,916,695 | A | * | 6/1999 | Fister et al. | 428/647 |
| 6,007,390 | A | * | 12/1999 | Cheng et al. | 439/886 |
| 6,183,886 | B1 | * | 2/2001 | Chen et al. | 428/647 |
| 6,770,383 | B2 | * | 8/2004 | Tanaka et al. | 428/646 |
| 6,793,544 | B2 | * | 9/2004 | Brady et al. | 439/886 |

FOREIGN PATENT DOCUMENTS

| DE | 32 12 005 | 10/1983 |
|---|---|---|
| DE | 35 09 022 | 11/1985 |
| DE | 36 35 692 | 9/1987 |
| DE | 199 32 867 | 1/2001 |
| DE | 199 53 780 | 4/2001 |
| EP | 0 825 682 | 2/1998 |
| EP | 1 081 251 | 3/2001 |
| EP | 1 096 523 | 5/2001 |

* cited by examiner

*Primary Examiner*—Truc Nguyen
(74) *Attorney, Agent, or Firm*—Kenyon & Kenyon LLP

(57) ABSTRACT

An electric contact, in particular an electric contact of a plug-in connector, has a metallic substrate to which a contact layer is applied. The contact layer is arranged as a structured layer.

10 Claims, 2 Drawing Sheets

ELECTRICAL CONTACT

FIELD OF THE INVENTION

The exemplary embodiment of the present invention is directed to an electric contact, in particular an electric contact of a plug-in connector.

BACKGROUND INFORMATION

An electric contact of this type is available and is used, for example, in the automobile industry.

Such an electric contact includes a metallic substrate, which is normally made of a copper-based alloy such as $CuSn_4$ bronze, CuNiSi or the like, on which a contact layer made of tin is situated. The contact layer may be a hot-tin-plated or electrolytically deposited layer which has a thickness of a few micrometers. An intermediary layer made of intermetallic compounds such as $CuSn_4$, $Cu_5Sn_6$ is formed by diffusion on the boundary surface with the substrate when a tin contact layer is used. The intermediary layer is harder than the contact layer and may grow as a function of the temperature.

Tin or a tin alloy is characterized by high ductility and good electric conductivity. Tin alloys or tin layers, however, have the disadvantage that they tend to wear off due to their low hardness and the resulting low wear resistance upon frequent insertions or vibrations caused by the vehicle or the engine, which results in increased oxidation, known as friction corrosion. Friction wear and/or friction corrosion may in turn result in failure of an electric automobile component associated with the contact in question, in particular a sensor, a control unit, or the like.

In tin or tin alloy layers of this type it is furthermore disadvantageous that the insertion forces for many applications are excessively high, because these contact layers have a strong tendency toward adhesion and high plastic deformability.

Furthermore, a tin-based contact layer of an electric contact, known as thermotin, is known in industry, which is made entirely of intermetallic phases and is manufactured by artificial aging. However, it has been found that thermotin has limited applicability, which may be shown in particular on the basis of chemical and abrasion testing.

Furthermore, Au—Co alloys on a nickel layer, silver plating on a copper or nickel layer, or gold plating were previously often used as contact layers in electric contacts.

In particular, silver-based, but also tin surfaces or contact layers tend toward cold fusion due to adhesion and are characterized by high friction coefficients in self-mated pairs.

Even in silver or gold layers previously used in electric contacts, oxidative wear of the substrate or of an intermediary layer used as an adhesion layer, often made of copper or nickel, may occur in the event of friction wear or flaking of the layer.

SUMMARY OF THE INVENTION

The electric contact according to the exemplary embodiment of the present invention, having a metallic substrate to which a structured contact layer is applied, has the advantage of an optimized tribological characteristic, which is adjustable via structuring. In particular, a contact layer of an electric contact having reduced friction coefficients and increased wear resistance may be manufactured via suitable structuring.

As usual, the contact layer of the electric contact according to the present invention has a layer thickness of between 1 μm and 6 μm. Structuring may be in the range between 1 nm and 1 μm, which qualifies it as nanostructuring.

The substrate of the electric contact according to the present invention may be a substrate normally used in the automobile industry for plug-in connectors, for example, a copper-based alloy such as $CuSn_4$ bronze, CuNiSi, or the like. Alternatively, a substrate made of a nickel-based alloy may also be used.

According to an exemplary embodiment of the electric contact according to the present invention, the structuring features particles between approximately 1 nm and 1 μm distributed, i.e., dispersed, in a matrix of the contact layer. A solid-state dispersion or nanodispersion is thus created. The nanodispersion may be produced by an electrolytic method. The particles may be dispersed in the crystalline or amorphous matrix in a crystalline or amorphous form.

The particle size of the particles dispersed in the matrix, whose proportion in the matrix may be between 1 vol. % and 50 vol. %, is advantageously in the range of 20 nm to 200 nm. Such particle sizes have been found ideal regarding their electrical and mechanical properties in 1 μm to 6 μm thick contact layers.

By introducing the nanodispersion into the contact layer matrix, the service life, in particular the number of insertion cycles and/or the friction corrosion resistance of the electric contact, may be increased.

The strength and hardness of the contact layer may thus be increased by introducing particles whose hardness is greater than that of the matrix. Particles of this type are made, for example, of $Al_2O_3$ which are dispersed in a matrix of tin or silver, for example. Alternatively, particles of yttrium oxide, zirconium oxide, titanium aluminide, titanium nitride, ruthenium alloy phases and/or the like may also be used. Introducing electrically conductive phases such as titanium nitride or ruthenium alloy phases as the particles dispersed in the matrix has the advantage that the electrical properties of the contact layer are not affected.

However, particles dispersed in the matrix, a silver matrix in particular, may also be formed by a solid-state lubricant. A solid-state lubricant of this type may be, for example, graphite or $MOS_2$, and results in reduced friction forces and insertion forces which must be applied to connect the electric contact with a mating contact.

In another exemplary embodiment of the electric contact according to the present invention, the dispersed particles are micro-oil capsules.

The micro-oil capsules, which represent lubricant capsules of a microscopic size and may be introduced into the matrix using an electrolytic process, may contain a tribologically active lubricant containing antioxidants and/or antiadhesive additives and are wrapped in a polymer skin, for example. The antioxidants and antiadhesive additives are released in the case of such a contact where the highest surface stresses occur on insertion or for micromovements due to vibrations. The polymer skins which wrap the oil capsules melt under the effect of a brief exposure to heat, for example, in the event of an increase in temperature to approximately 100° C. to 200° C., for example.

Homogeneous distribution of the micro-oil capsules in the matrix may be achieved using ultrasound-generated turbulence or other hydraulic measures.

Alternatively, oil capsules or oil cavities may be introduced by melting a hot-tin-plated surface in an oil bath or by an electrolytic method. In this case, the oil capsules have no polymer skin.

The micro-oil capsules introduced into the matrix represent carbon-containing islands in the structure and cause the friction forces and insertion forces to be optimized, increase the service life of the layer and the friction corrosion resistance.

In an exemplary embodiment of the present invention, tin or silver may be used as a matrix for the micro-oil capsules.

In another embodiment of the electric contact according to the present invention, structuring is formed by a multilayer system which is made up of successive layers having varying chemical compositions. The friction coefficients of the contact layer may be reduced and its wear resistance increased also by using such a multilayer system.

For example, the multilayer system may be a contact layer manufactured on the basis of gold or silver, such as a gold/cobalt layer system or a silver/indium layer system. Each of the individual layers of the multilayer system is made of an alloy of these elements, for example, the proportion of the individual elements varying from layer to layer. It is also conceivable to select a gold/silver layer system as the contact layer, the proportion of gold and silver varying from layer to layer. The layer sequence may be ABABA . . . , for example.

To improve the contact between the electric contact and its mating contact, the contact layer may have a noble metal cover layer, at least in some areas. The noble metal cover layer may have a thickness of between 0.1 μm and 0.3 μm, thus representing a "flash" layer. Ruthenium, gold, platinum, and/or palladium in particular are suitable as noble metals for the flash layer.

The contact layer of the electric contact according to the present invention may be manufactured using an electrolytic method.

Further advantages and advantageous refinements of the object according to the present invention are described herein and/or by the drawings.

DETAILED DESCRIPTION

Figure 1:
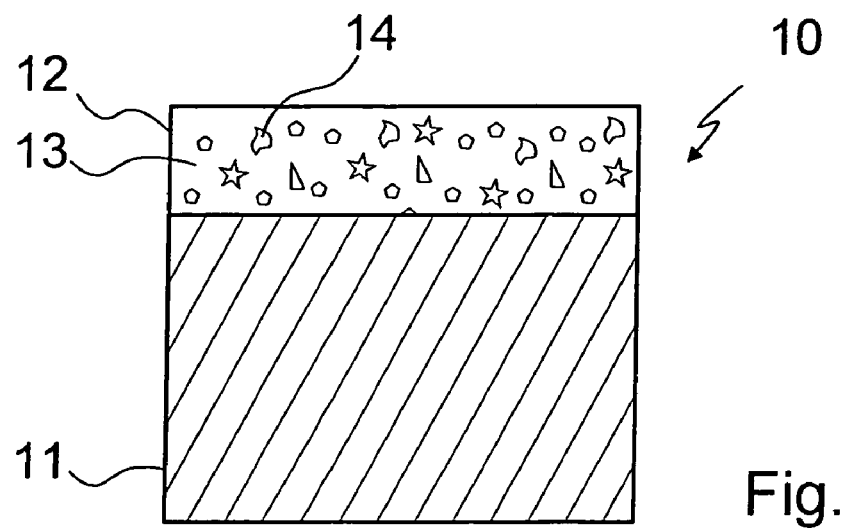
FIG. 1 shows a section of a first embodiment of an electric contact.

FIG. 1 schematically illustrates a surface of an electric contact 10, which is a contact of a plug-in connector for use in an automobile.

Electric contact 10 includes a substrate 11 which is manufactured from a copper-based alloy such as $CuSn_4$, $CuNi_2Si$ or the like. Substrate 11 has a thickness of between 0.1 mm and 0.5 mm.

A contact layer 12 is applied to substrate 11 by an electrolytic method. Contact layer 12 has a layer thickness of between approximately 1 μm and 3 μm and has a matrix 13 made of tin. Hard particles 14 of aluminum oxide $Al_2O_3$ having a particle size of between 20 nm and 200 nm are distributed, i.e., "dispersed," in matrix 13. Contact layer 12 thus represents a solid-state nanodispersion.

Figure 2:
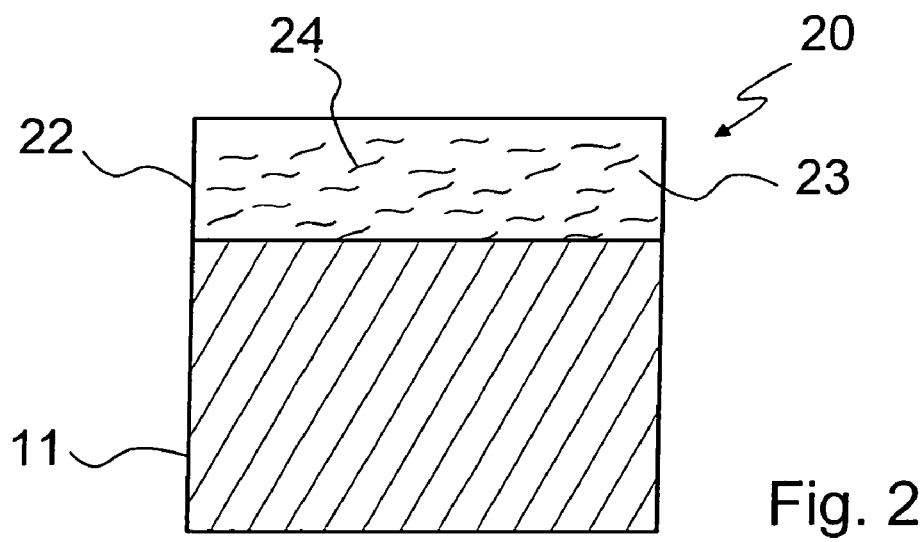
FIG. 2 shows a section of a second embodiment of an electric contact.

FIG. 2 schematically illustrates an electric contact 20, which is also a contact of a plug-in connector for use in an automobile.

Similar to the electric contact of FIG. 1, electric contact 20 includes a substrate 11 which is made of a copper-based alloy.

Substrate 11 of electric contact 20 is provided with a contact layer 22, which has a matrix 23 of silver. Graphite particles 24, known as graphite flakes, are homogeneously distributed in silver matrix 23. Graphite flakes 24 are used as a solid-state lubricant and have a particle size of between 1 μm and 1 nm. The graphite flakes may be present in a platelet form and may have a length/thickness ratio of approximately 2 to 50 and/or have any other shape, for example, a spherical shape.

Figure 3:
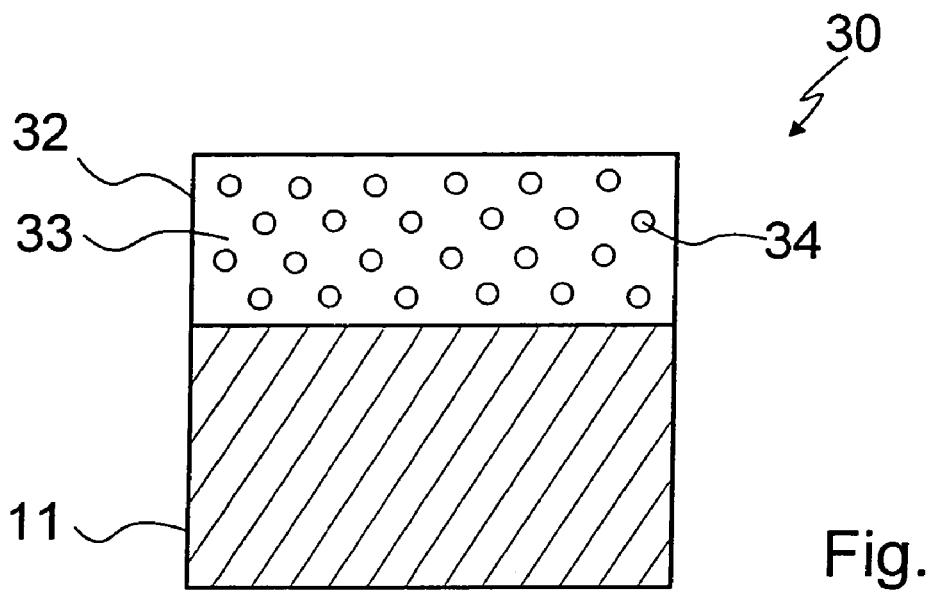
FIG. 3 shows a section of a third embodiment of an electric contact.

FIG. 3 illustrates an electric contact 30, which is also a contact of a plug-in connector for use in an automobile.

Similar to the electric contact of FIG. 1, electric contact 30 includes a substrate 11 which is made of a copper-based alloy. However, substrate 11 of electric contact 30 is provided in this case with a contact layer 32, which has a matrix 33 of silver, in which oil capsules 34 are distributed, i.e., dispersed. The diameter of oil capsules 34 is less than 1 μm, i.e., it is in the sub-micrometer range. The oil capsules contain a tribologically active lubricant having antioxidants and antiadhesive additives, as well as a polymer skin, which melts even upon brief exposure to heat. Lubricant capsules 34 allow the friction/insertion forces occurring when electric contact 20 is connected to a mating contact to be reduced.

Figure 4:
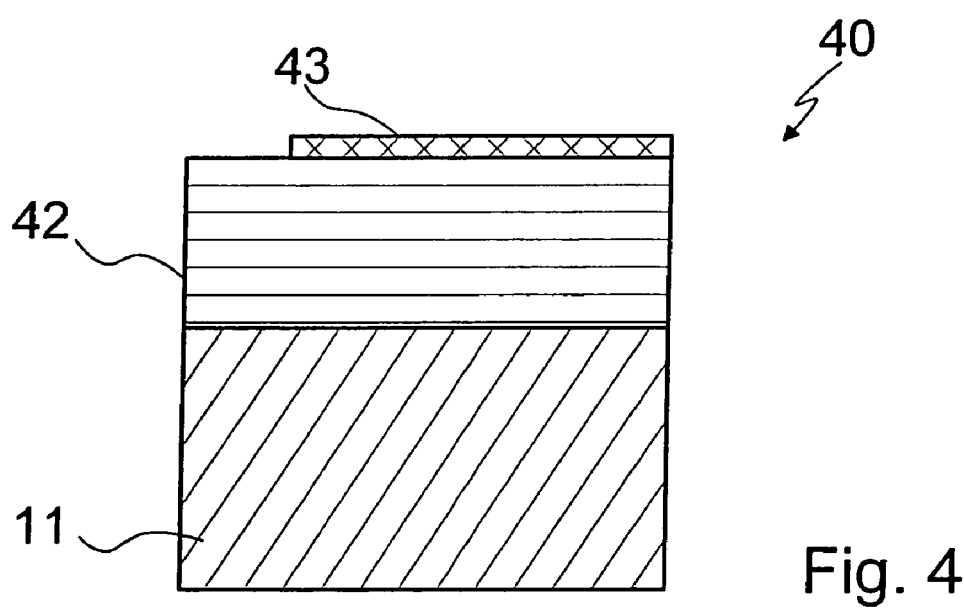
FIG. 4 shows a section of a fourth embodiment of an electric contact.

FIG. 4 illustrates an electric contact 40, which is also a contact of a plug-in connector for use in an automobile.

In electric contact 40, a multilayer system 42 is situated on a substrate 11, which corresponds to the substrates in the exemplary embodiments according to FIGS. 1 through 3 and is thus made of a copper-based alloy and is composed of a plurality of layers whose thickness is in the nanometer range. The individual layers differ through their chemical compositions and represent a silver/indium alloy, in which the proportion of silver and indium varies from layer to layer. Layer system 42 has a layer sequence ABAB . . . here, where A and B stand for a silver/indium alloy having a defined composition.

In this embodiment, a flash layer 43 made of ruthenium or gold, designed as a cover layer, is situated on the top of contact layer 42. Cover layer 43 may have a thickness of approximately 0.1 μm.

What is claimed is:

1. An electric contact, comprising:
   a metallic substrate; and
   a contact layer which is applied to the metallic substrate, wherein the contact layer includes a structured layer;
   wherein structuring for the structured layer includes particles dispersed in a matrix, at least some of the dispersed particles having a greater hardness than the matrix and made of at least one of aluminum oxide, zirconium oxide, yttrium oxide, a titanium aluminide, and a ruthenium alloy phase and the structuring for the structured layer is such that particles having a size between 1 nm and 1 μm are dispersed in a matrix.

2. The electric contact of claim 1, wherein the proportion of the particles dispersed in the matrix is between 1 vol. % and 50 vol. %.

3. The electric contact of claim 1, wherein the dispersed particles are oil capsules or oil cavities.

4. The electric contact of claim 1, wherein the electric contact is of a plug-in connector.

5. The electric contact of claim 1, wherein at least some of the dispersed particles are made of a solid-state lubricant, which is graphite.

6. The electric contact of claim 3, wherein the oil capsules include at least one of a lubricant having antioxidants and antiadhesive additives and are bounded by a polymer skin.

7. An electric contact, comprising:
a metallic substrate; and
a contact layer which is applied to the metallic substrate, wherein the contact layer includes a structured layer;
wherein structuring for the structured layer is such that particles having a size between 1 nm and 1 µm are dispersed in a matrix;
wherein at least some of the dispersed particles are made of a solid-state lubricant, the solid-state lubricant including at least one of graphite and molybdenum disulfide.

8. An electric contact, comprising:
a metallic substrate; and
a contact layer which is applied to the metallic substrate, wherein the contact layer includes a structured layer;
wherein structuring for the structured layer is such that particles having a size between 1 nm and 1 µm are dispersed in a matrix;
wherein the matrix is made of silver or a silver alloy and the dispersion structure is produced electrolytically.

9. An electric contact, comprising:
a metallic substrate; and
a contact layer which is applied to the metallic substrate, wherein the contact layer includes a structured layer;
wherein the structured layer is formed by a multilayer system which is made up of successive layers having different chemical compositions, the multilayer system including layers of indium and silver.

10. An electric contact, comprising:
a metallic substrate; and
a contact layer which is applied to the metallic substrate, wherein the contact layer includes a structured layer;
wherein structuring for the structured layer is such that particles having a size between 1 nm and 1 µm are dispersed in a matrix;
wherein at least some area of the contact layer has a noble metal cover layer which is made of one of gold, silver, platinum, ruthenium, palladium, or an alloy of these elements.

* * * * *